(12) United States Patent
Hahn

(10) Patent No.: US 8,857,460 B2
(45) Date of Patent: Oct. 14, 2014

(54) VALVE INSERT FOR A SANITARY FITTING

(75) Inventor: Arno Hahn, Schiltach (DE)

(73) Assignee: Hansgrohe SE, Schiltach (DE)

( * ) Notice: Subject to any disclaimer, the term of this patent is extended or adjusted under 35 U.S.C. 154(b) by 122 days.

(21) Appl. No.: 13/482,381

(22) Filed: May 29, 2012

(65) Prior Publication Data
US 2012/0305103 A1    Dec. 6, 2012

(30) Foreign Application Priority Data
May 31, 2011   (DE) .................... 10 2011 076 828

(51) Int. Cl.
F16K 1/42   (2006.01)
F16K 27/02   (2006.01)
F16K 21/04   (2006.01)

(52) U.S. Cl.
CPC ............ *F16K 27/0236* (2013.01); *F16K 21/04* (2013.01)
USPC ....................... 137/269; 137/270; 137/315.13

(58) Field of Classification Search
USPC .............. 137/269, 270, 801, 315.13; 251/331
See application file for complete search history.

(56) References Cited

U.S. PATENT DOCUMENTS

| | | | |
|---|---|---|---|
| 976,804 A * | 11/1910 | Hulings | ................ 137/270 |
| 2,216,292 A * | 10/1940 | Evleth | ................ 251/331 |
| 2,917,273 A | 12/1959 | Best | |
| 3,739,804 A | 6/1973 | Dubreuil | |
| 3,851,658 A | 12/1974 | Bunyard | |
| 4,557,288 A | 12/1985 | Botnick | |
| 4,676,270 A | 6/1987 | Knapp et al. | |
| 4,804,011 A | 2/1989 | Knapp | |
| 4,846,207 A | 7/1989 | Humpert et al. | |
| 5,549,134 A | 8/1996 | Browne et al. | |
| 5,853,023 A * | 12/1998 | Orlandi et al. | ................ 137/271 |
| 6,604,542 B1 * | 8/2003 | Bircann et al. | ................ 137/269 |
| 2007/0144593 A1 | 6/2007 | Egli | |
| 2012/0132296 A1 | 5/2012 | Parsons et al. | |

FOREIGN PATENT DOCUMENTS

DE    9112921 U1    1/1992
EP    1367306 A1    12/2003

OTHER PUBLICATIONS

Official Action, Aug. 16, 2012, in EP 12168683_6.
Official Action, Mar. 12, 2012, in DE 102011076828_9.

* cited by examiner

*Primary Examiner* — Kevin Lee
(74) *Attorney, Agent, or Firm* — Duane Morris LLP

(57) ABSTRACT

A valve insert for a sanitary fitting can be inserted as an insert into a recess in the housing of the sanitary fitting and interacts there with lines of the sanitary fitting that open into the recess. The valve insert contains a base element which receives and holds the moving parts of the valve contained in the valve insert. An adapter element which is preferably injection-molded from plastics material and contains a valve inlet opening and a valve outlet opening can be connected in an exchangeable manner to this base part. The openings interact with the lines that open into the recess. A water guide leads from these two openings to the valve. By exchanging the adapter element, the valve insert can be used for different applications. Preferably, the valve seat itself can also be arranged in the adapter element.

18 Claims, 3 Drawing Sheets

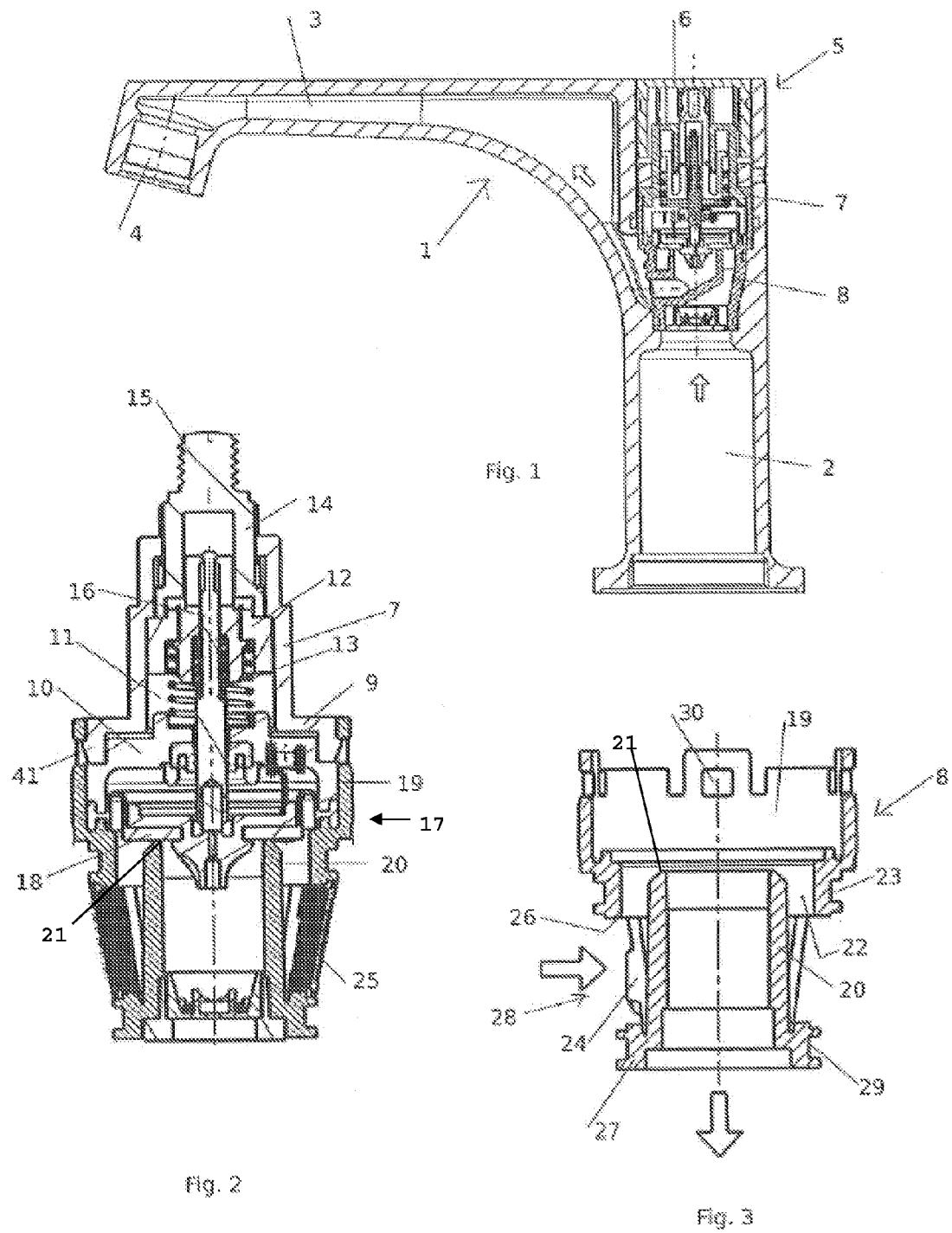

VALVE INSERT FOR A SANITARY FITTING

FIELD

The invention relates to a sanitary fitting with a shutoff valve.

BACKGROUND

There are a very wide variety of requirements in sanitary fittings as to how the water guides to a shutoff valve and away from said shutoff valve are to be configured. Depending on the type and shape of the fitting, the water inlet may arrive at the shutoff valve from below or from the side, and also the outlet from the valve may adopt a very wide variety of directions.

SUMMARY

The invention is based on the object of proposing a shutoff valve which is designed as a valve insert and can be adapted to the very wide variety of installation requirements using simple measures.

To achieve this object, the invention proposes a valve insert for a sanitary fitting, that has the features mentioned in the appended claims.

The adapter which takes over the water guides from the channels in the fitting housing to the valve and away from the valve cannot only easily be produced but can also easily be adapted to the particular use situation. This is true in particular if said adapter is produced from plastics material. By exchanging an adapter or, under some circumstances, also by plugging an adapter into a different socket, the valve insert can be rendered usable for a very wide variety of use situations.

It is conceivable for the adapter element only to take over the water guides to the valve. In a development of the invention, provision may be made for the valve seat of the valve also to be arranged or formed in the adapter element. This also has the advantage, inter alia, that the valve seat can likewise be changed by changing the adapter element.

In a further development of the invention, provision may be made for the adapter element to have holders or mounts for sealing elements, with which the valve inlet and/or the valve outlet can be sealed with respect to the housing of the sanitary fitting. It is then unnecessary for the seals to be attached to the fitting housing. The mounts may be, for example, grooves which can be configured in such a manner that an O-ring can be fixed therein.

The valve insert is intended for insertion into a recess provided therefore in a sanitary fitting. Recesses of this type generally at least approximately have a cylindrical shape. Accordingly, the valve insert is also at least approximately cylindrical. According to the invention, provision may be made, in a development, for the valve inlet and/or the valve outlet to be arranged or formed on an end side of the adapter element.

It is likewise possible for the valve inlet and/or the valve outlet to be arranged in a lateral face of the adapter element.

In a development, the invention proposes that the valve closing body be formed such that it can move in a direction perpendicularly to the valve seat, wherein said direction runs axially in the case of a cylindrical or approximately cylindrical valve insert.

It has already been mentioned that the valve seat may also be arranged in the adapter element. According to the invention, provision can now be made in a development, for the valve seat to be formed at the end of a tubular connector in the adapter, and to be formed in particular by the end of the tubular connector.

In a further development of the invention, provision may be made for the valve inlet into the adapter element to lead to an annular space which surrounds the valve seat, or if the valve seat is arranged at the end of a tubular connector, surrounds the tubular connector. In this manner, the water guide between the valve inlet and the actual valve has a large cross section such that low pressure losses occur.

According to the invention, provision may be made for the valve inlet into the adapter element to have a strainer which covers the entire opening.

In a preferred embodiment both the valve inlet and the valve outlet are arranged in a lateral face of the adapter element, wherein the valve inlet extends around at least approximately half the circumference of the adapter element. This results in a large inlet opening and in a large strainer surface, if the inlet opening is covered by a strainer. Strainers of this type retain impurities in the inflowing water and thereby increase the service life of the valve.

In a further preferred embodiment of the invention, the valve outlet is arranged in an end face of the adapter element while the valve inlet is arranged in a lateral face and extends substantially around the entire circumference of the lateral face of the adapter element.

The invention is usable advantageously in particular if the valve is a diaphragm valve.

According to the invention, the insert may be designed in such a manner that it contains a base part to which the adapter element is releasably connected. This may take place by means of snapping-in or locking in some other way. The base part then serves for guiding and mounting the valve closing body and the actuating element, with which the valve closing body is actuated.

The connection may be configured in such a manner that any angular alignment between the two parts is possible.

The invention likewise proposes a combination of an insert base part and at least two different adapter elements.

BRIEF DESCRIPTION OF THE DRAWINGS

Further features, details and advantages of the invention emerge from the claims and the abstract, the wording in both of which refers to the content of the description, and from the description below of preferred embodiments of the invention and with reference to the drawing, in which:

FIG. 1 shows schematically a section through a sanitary fitting with a valve insert according to the invention;

FIG. 2 shows, on an enlarged scale, an axial section through a valve insert according to the invention;

FIG. 3 shows an enlarged section through a first adapter element;

DETAILED DESCRIPTION

Figure 4:
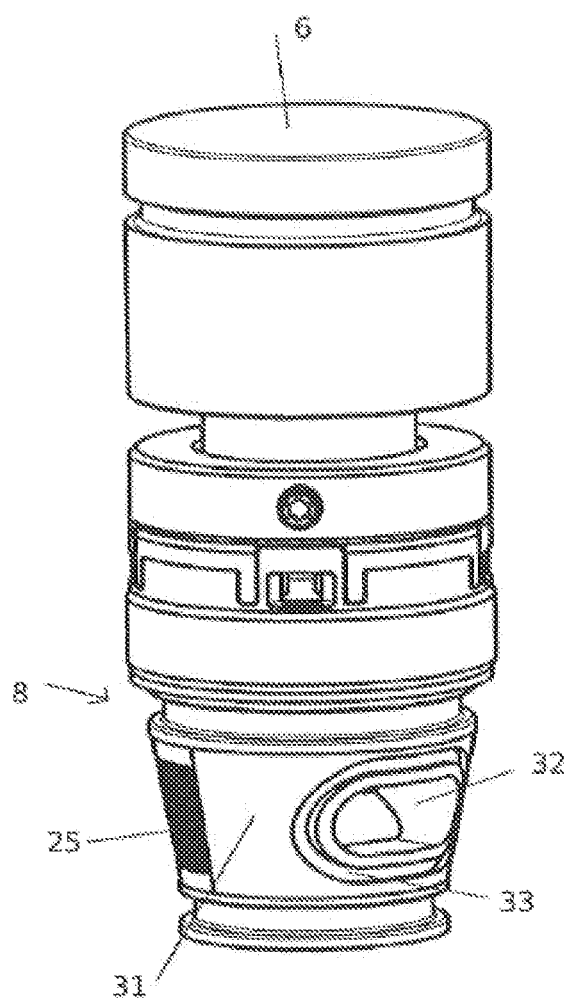
FIG. 4 shows the perspective view of a valve insert.

FIG. 1 shows, in a section, a typical use situation of a sanitary fitting 1, in which the valve insert according to the invention is used. The sanitary fitting 1 contains an upwardly directed, cylindrical column 2, at the upper end of which an arm 3 is integrally formed horizontally, directed laterally, the arm containing the outlet 4 at the end thereof. The water therefore has to pass through the hollow column 2 from below to the outlet 4, but through a shutoff valve first. The shutoff valve 5 is inserted in a recess in the fitting housing, which recess is open upward. The water is intended to be deflected as little as possible, since each deflection of the water causes pressure losses. A valve is therefore required which is designed as an insert and in which the water enters from below i.e. axially, and leaves said valve laterally.

The valve insert 5 contains an upper base part 7 and a lower adapter element 8 arranged on the base part. Said adapter element takes over the water guide from the water inlet side to the valve and from the valve to the water outlet out of the valve. Details of the adapter element are explained in more detail later.

Details of the valve insert which is indicated in FIG. 1 emerge from the enlarged illustration in FIG. 2, in which, however, the actuating handle 6 of the valve is not illustrated. The valve insert contains a base part 7. The base part 7 forms a first section which is adjoined by a second section 9 having an enlarged diameter. A base 10 which, together with the first section, forms an interior space 11 is inserted in the second section 9. A sliding piece 12 which is acted upon by a compression spring 13 is arranged displaceably in the interior space 11. A pressure element 14 protrudes out of the base part 7. It is provided with a threaded pin 15, to which a handle can be connected. A rod 16 which can be displaced by pressing the pressure element 14 downward is arranged in the sliding piece 12. The rod 16 is the actuating element for a diaphragm valve 17. The diaphragm valve 17 contains a valve closing body 18.

An adapter element 8, which however differs from the adapter element 8 in FIG. 1, is fitted on the base part 7. This adapter element is therefore a different adapter element 8. The adapter element has an upper section 19 in which said adapter element is connected to the base part 7. The diaphragm valve 17 of the base part 7 is designed in such a manner that it projects into the upper part 19 of the adapter element 8.

The interior of the adapter element 8 has a tubular connector 20 which ends in a sharp edge 21 in the direction of the base part 7. The tubular connector 20 is cylindrical.

An annular space 22 is formed in that region of the adapter element which coincides in the axial direction with the sharp edge of the tubular connector 20, said annular space being produced by the upper, approximately cylindrical, outwardly closed part 19 of the adapter element projecting beyond the longitudinal edge 21 of the connector 20. An encircling groove 23 which serves for receiving a seal is formed on the outer side of said annular space 22.

The lower end of the tubular connector 20 corresponds to the axial end of the adapter element. Said lower end of the tubular connector 20 is connected to the upper part 19 of the adapter element via a plurality of webs 24. The resultant open lateral face of the lower part of the adapter element is provided with strainers 25 which extend over substantially the entire circumference of the open part of the adapter element 8. An opening which forms the valve inlet 28 is therefore formed between the lower edge 26 of the upper part 19 of the adapter element and the lower border 27 of the tubular connector 20. The outside of the lower end of the tubular connector 20 also has a groove 29 for receiving an encircling seal.

The adapter element 8 illustrated in FIG. 2 is illustrated on an enlarged scale in FIG. 3.

At that end of the upper part 19 of the adapter element 8 which faces the base part 7, the border edge has four tabs 30 which are distributed over the circumference, are each provided with an opening and with which the adapter element 8 can be snapped onto corresponding hooks 41 of the base part 7.

FIGS. 2 and 3 therefore show a valve insert with an adapter element, in which the inlet into the valve insert takes place radially, i.e. the valve inlet is arranged in a lateral face, and the valve outlet is arranged axially in an end face of the adapter element. The valve inlet extends, with the exception of the webs 24, virtually over the entire lateral face. This is also true of the strainers 25.

FIG. 4 shows a further embodiment of a valve insert according to the invention. FIG. 4 shows a perspective view of the valve insert with a handle 6. The internal design of the valve insert corresponds, as far as the actuation of the valve is concerned, to that of FIG. 2 and is therefore not repeated again. The adapter element 8 which is connected to the base part 7 contains, in the visible lateral face 31, a valve outlet 32 which is surrounded by a groove 33 for receiving a seal. The groove 29 in the lower region of the adapter element 8 can likewise be seen. A section through the adapter element 8 of the embodiment according to FIG. 4 can be gathered from FIG. 5. The connector 20 is designed in the end region thereof, which is directed into the interior of the valve insert, in the same manner as in the preceding embodiment. The edge 21 of said connector therefore forms the valve seat for the valve closing body 18. However, the connector is then no longer of cylindrical design but rather opens out via a right angled balancing means in the lateral face 31 where it forms the valve outlet 32.

Figure 5:
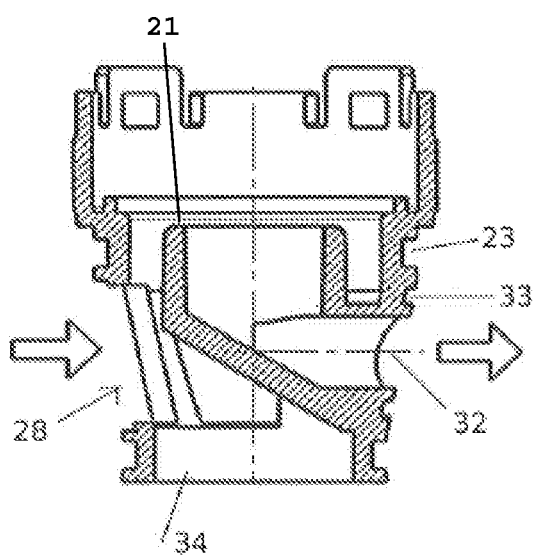
FIG. 5 shows a section through a further adapter element.

The valve inlet 28 is also formed here in the lateral face, wherein the strainer 25 is omitted in the illustration of FIG. 5 but can be seen in FIG. 4. In this embodiment, the valve inlet 28 and the associated strainer 25 extend approximately around half the circumference of the lateral face of the adapter element 8. In this case, the lower opening 34 in the adapter element 8 does not have any function.

Figure 6:
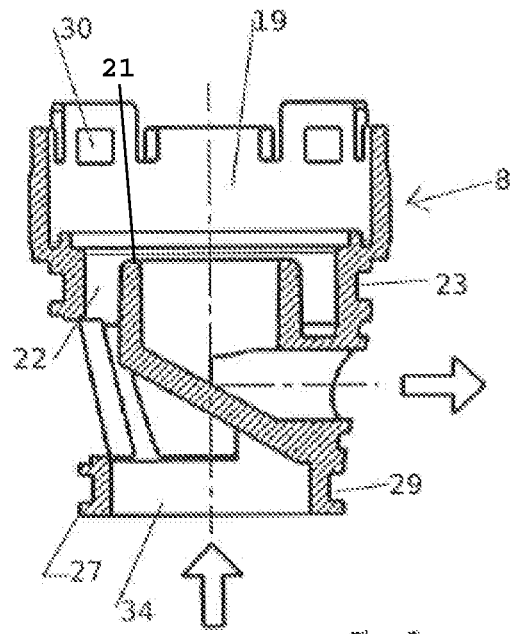
FIG. 6 shows a different use of the adapter element from FIG. 5.

However, the adapter element in FIG. 5 may be inserted in a fitting body in such a manner that it takes over the water guide between the housing of the sanitary fitting and the valve insert in the manner illustrated in FIG. 6. In this case, the lower opening 34 in the adapter element serves as the valve inlet. The water then flows past the angled connector 20 in the direction of the valve closing body 18 which, in turn rests on the end edge 21 of the connector 20 as long as the valve is closed.

After opening of the valve, the water then flows through the lateral face of the adapter element 8, i.e. radially outward, in the manner illustrated by the arrows.

Figure 7:
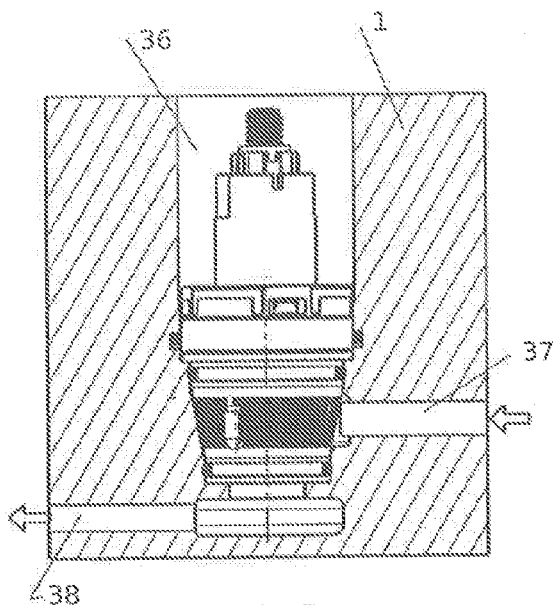
FIG. 7 shows schematically the use of a valve insert in a first configuration.

The following FIGS. 7 to 10 show, schematically, different types of use which can be implemented with a valve insert according to the invention. In this case, the actual sanitary fitting 1 is only illustrated schematically. The sanitary fitting 1 contains a recess 36 into which line channels open. For example, a line channel 37 opens into the recess 36 of the sanitary fitting, which is illustrated in FIG. 7, transversely with respect to the axis of the recess 36 while the channel 38 which leads away likewise runs transversely with respect to the longitudinal axis of the recess. However, the channel 38 leading away runs offset in the axial direction in relation to the channel 37. A valve insert according to the invention is inserted into the recess 36, wherein an adapter element which corresponds to the embodiment according to FIG. 3 is selected.

Figure 8:
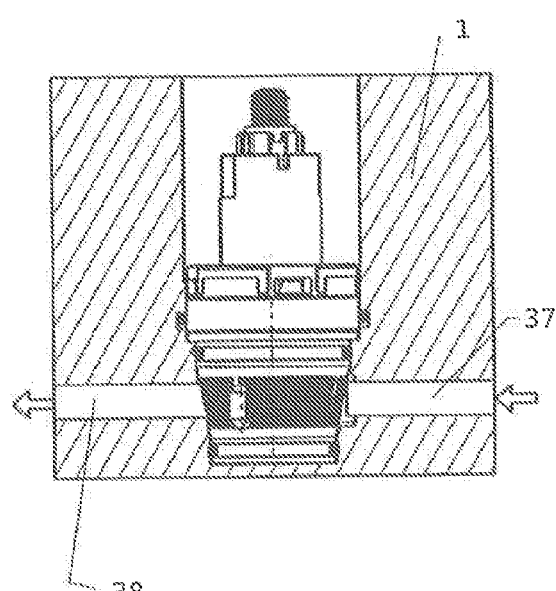
FIG. 8 shows, likewise schematically, the use of a valve insert in a second configuration.

In the embodiment according to FIG. 8, the two channels 37, 38 mentioned run at the same height. This type of line can also be implemented with a valve insert according to the invention by an adapter element from FIG. 5 being used in this case.

Figure 9:
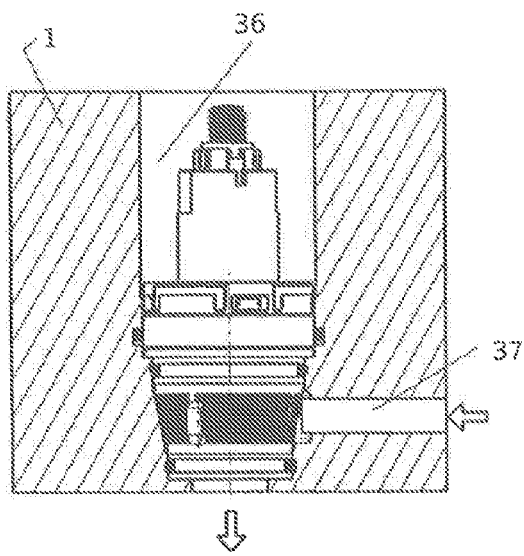
FIG. 9 shows the use of a valve insert in a third configuration.

FIG. 9 shows a sanitary fitting in which the channel 37 bringing up the water runs transversely with respect to the axis of the recess 36, but the water is intended to flow off axially. The adapter element illustrated in FIG. 3 is suitable for this type of arrangement.

Figure 10:
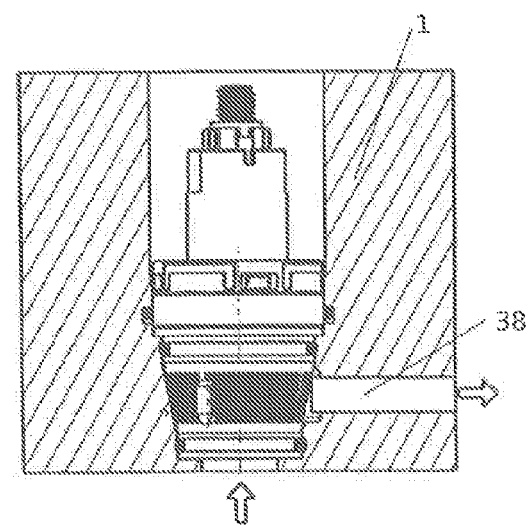
FIG. 10 shows the use of a valve insert in a fourth configuration.

The sanitary fitting embodiment that is illustrated in FIG. 10 uses a channel arrangement which is directly the opposite in the embodiment according to FIG. 9. The water brought up comes axially from below and is intended to flow off transversely with respect to the axis of the recess 36 after leaving the valve. For this purpose, an adapter element according to FIG. 5 or FIG. 6 is used, since said adapter element which is illustrated in both of the figures mentioned can be used in different ways. In the use according to FIG. 6, the left opening is ineffective. It therefore also does not need to contain any strainer element.

The use of four tabs 30 which are each offset by 90° around the circumference of the adapter element 8 enables the adapter element to be connected to the base part of the valve insert in a manner also offset by 90°, if this should be required, for adaptation to the wide variety of use situations.

However, this arrangement may also be configured differently in order to obtain a smaller separation. For example, an annular undercut without an angular fixing means is also possible.

In the present application, the use of a diaphragm valve has been illustrated and described in FIG. 2. However, a diaphragm valve is merely one example of a valve in which the valve closing body can move perpendicularly to the surface defined by the valve seat, in order to close the valve. The invention may, of course, also be used with different types of valve, for example if the valve closing body is brought closer to or moved away from the valve seat by a screwing movement.

The invention claimed is:

1. A valve insert for a sanitary fitting, comprising:
   an actuating element for a valve,
   a valve inlet for water, said valve inlet leading into the valve,
   a valve outlet that leads the water out of the valve,
   a valve seat, and
   a valve closing body that interacts with the valve seat and can be actuated by the actuating element,
   wherein the valve insert has an upper insert base part comprising the actuating element and the valve closing body, and a lower adapter element comprising the valve inlet into the valve, the valve outlet out of the valve and the valve seat,
   wherein the valve seat is arranged at an upper section of the adapter element for interacting with the valve closing body, and
   wherein the adapter element is exchangeably connected to the upper insert base part.

2. The valve insert according to claim 1, wherein the adapter element further comprises holders for sealing elements for sealing at least one of the valve inlet and the valve outlet with respect to the sanitary fitting.

3. The valve insert according to claim 1, wherein one of the valve inlet and the valve outlet is arranged on an axial end face of the adapter element.

4. The valve insert according to claim 1, wherein at least one of the valve inlet and the valve outlet is arranged in at least one lateral face of the adapter element.

5. The valve insert according to claim 1, wherein the valve closing body is movable perpendicularly to the valve seat.

6. The valve insert according to claim 1, wherein the valve seat is at an end of a tubular connector in the adapter element.

7. The valve insert according to claim 1, wherein the valve inlet leads to an annular space surrounding the valve seat.

8. The valve insert according to claim 1, wherein the valve inlet and the valve outlet are arranged in at least one lateral face of the adapter element and the valve inlet extends around at least approximately half a circumference of the adapter element.

9. The valve insert according to claim 1, wherein the valve outlet is arranged in an end face of the adapter element and the valve inlet extends substantially around an entire circumference of a lateral face of the adapter element.

10. The valve insert according to claim 1, comprising a diaphragm valve.

11. The valve insert according to claim 6, wherein the valve seat is formed by the end of the tubular connector.

12. In combination, an insert base part and plural adapter elements that are exchangeably connectable to the insert base part to form a valve insert configured to fit into a recess of a sanitary fitting, wherein the plural adapter elements each have a valve inlet and a valve outlet, and at least one of the valve inlets and valve outlets of the plural adapter elements are placed at different locations on said plural adapter elements for leading water into and out of the valve from different directions, respectively,
   wherein the insert base part comprises an actuating element and a valve closing body actuated by the actuating element,
   wherein the adapter elements each comprise a valve seat arranged at an upper section of the adapter element for interacting with the valve closing body.

13. The combination of claim 12, wherein the plural adapter elements include adapter elements having one of said inlet and outlet on an axial end of the respective adapter element and an other of said inlet and outlet on a lateral side.

14. The combination of claim 12, wherein the plural adapter elements include adapter elements having said inlet and outlet on lateral sides of the respective adapter element.

15. The combination of claim 12, wherein the adapter elements further comprise holders for sealing elements for sealing at least one of the inlet and the outlet with respect to the sanitary fitting.

16. The combination of claim 12, wherein the valve seat is provided by an end of a tubular connector in each of the adapter elements.

17. The combination of claim 16, wherein at least one of the inlet and the outlet of the adapter elements leads to an annular space surrounding the valve seat.

18. The combination of claim 16, wherein the valve closing body comprises a diaphragm.

* * * * *